United States Patent [19]

Clawson et al.

[11] 4,453,835

[45] Jun. 12, 1984

[54] TEMPERATURE SENSOR

[76] Inventors: Burrell E. Clawson, 1844 3rd St. #B; James Weigl, 1844 3rd St. #C, both of Riverside, Calif. 92507

[21] Appl. No.: 373,835

[22] Filed: May 3, 1982

[51] Int. Cl.³ .......................... G01K 7/22; G01K 1/08
[52] U.S. Cl. ..................................... 374/185; 374/208
[58] Field of Search ............... 374/183, 185, 208, 154, 374/158

[56] References Cited

U.S. PATENT DOCUMENTS

| 2,785,216 | 3/1957 | Winner, Jr. | 374/208 X |
| 2,838,935 | 6/1958 | Di Cecid et al. | 374/208 X |
| 3,230,772 | 1/1966 | Leslie et al. | 374/208 X |
| 3,751,305 | 8/1973 | Huebscher | 374/208 X |

Primary Examiner—Gerald Goldberg
Assistant Examiner—Joseph W. Roskos
Attorney, Agent, or Firm—Grover A. Frater

[57] ABSTRACT

A temperature probe is formed by enclosing a thermistor in a sensor sheath one of whose ends is closed and in engagement with the thermistor, and by biasing the thermistor into engagement with the inner surface of the sheath. The biasing is accomplished by coiling the transistor wires and using them as a compression spring. A closed air space is formed within the sheath by closing its other end with the end of a coaxial cable and overmolding an outer housing.

17 Claims, 4 Drawing Figures

U.S. Patent  Jun. 12, 1984  4,453,835
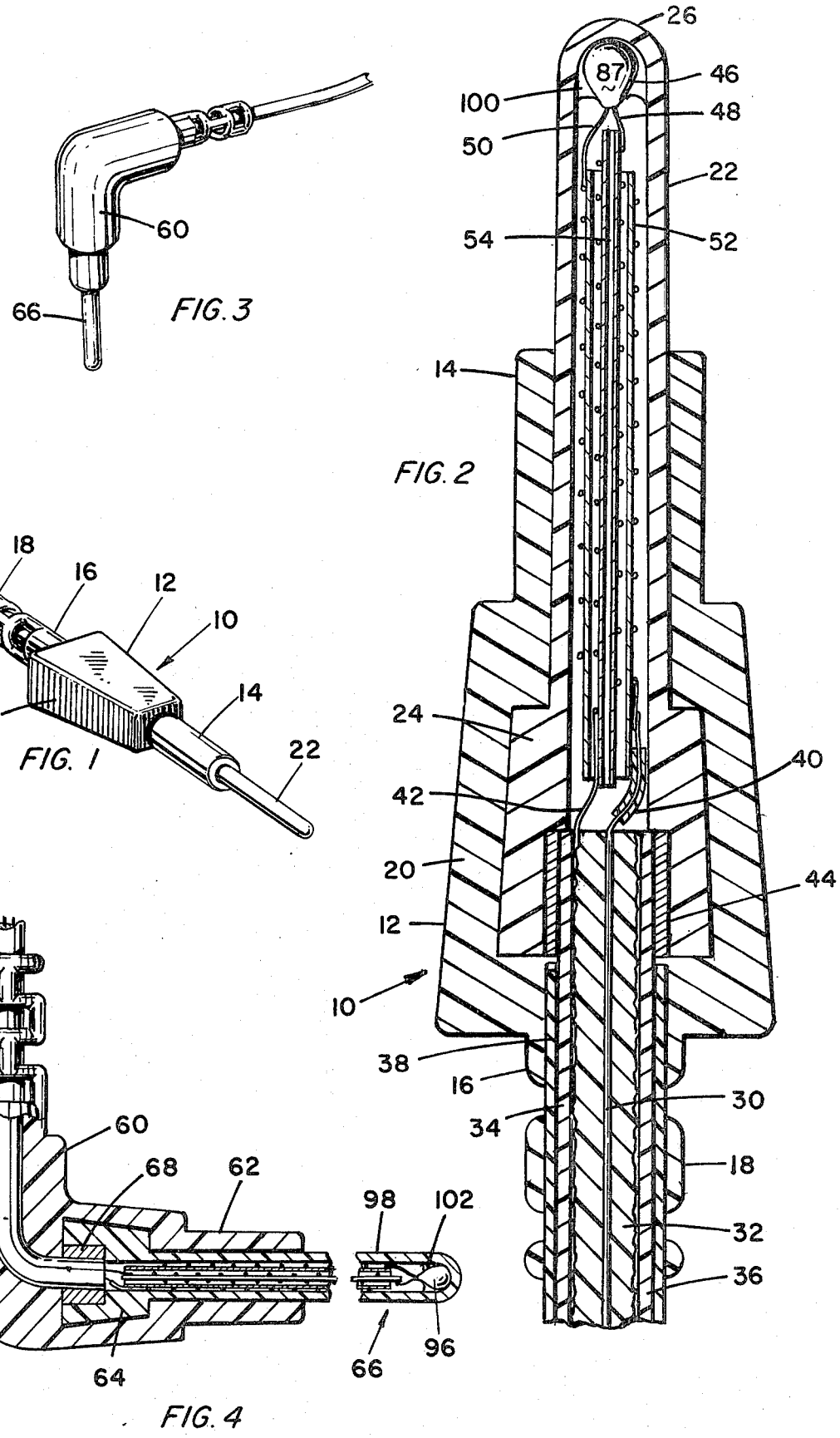

TEMPERATURE SENSOR

TECHNICAL FIELD

This invention relates to improvements in temperature sensing probes and, while not limited thereto, to improvements in probes for measuring temperatures of respiratory gasses.

BACKGROUND ART

The electrical conductivity of many materials is variable as of function of temperature. Such materials, when packaged as temperature sensitive resistors, are called "thermistors" and are much used to measure temperature. The current that flows through the thermistor and the potential drop across the device is the analog of temperature.

Current and voltage changes in and across thermistors are faithfully repeatable. Thus, thermistors per se are accurate measuring devices. However, the accuracy that is achieved in practice depends upon ability to subject the thermistor to the temperature to be measured and to shield it from influences that operate to alter thermistor temperature from the test temperature value.

In practical applications it is necessary to mount the sensor and to enclose and shield it. The combination of the temperature sensing element and its housing or mounting is often called a temperature probe. Its mass and the thermal conductivity of its parts may differ greatly from the mass and conductivity of the object or medium whose temperature is to be measured.

In one important application measuring the temperature of air and other respiratory gases with a thermistor is complicated by the difference between the mass and thermal conductivity of the gas and the probe materials, and by the need to construct the probe so that it can be kept or made sterile for each use. The requirement for sterility usually dictates that the probe be removable from the respiratory apparatus and that the thermistor, or at least the lead wires to the thermistor, be enclosed in a housing or covering that is readily made sterile. Probes of that kind exist but their response, at least when measuring gas temperature, is unduly slow.

The need for fast, accurate respiratory gas temperature measurement is greatest when the gas temperature is elevated before delivery to the patient and when the patient is incapable of self-help or of sounding an alarm if the gas temperature control system fails. In an incubator for premature infants, for example, the respiratory gas is heated and humidified before delivery. A failure of the humidity or the temperature control system can result in a rapid change in gas temperature to a dangerous level. The infant is helpless to save itself and the temperature change is not visible or otherwise apparent to the attendant. The temperature sensing probe must respond immediately to temperature change with an appropriate signal. Neglecting other elements of the probe, the thermistor lead wires alone are capable of conducting heat away from the thermistor more efficiently than air and other gas mixtures can transfer heat to the thermistor, and the heat storage capacity of the lead wires is greater than that of air. The result is lagging response to temperature change and failure to achieve temperature of the thermistor equal to the surrounding air stream, i.e., it reads low. Finding a solution to that problem is complicated by the need to enclose the lead wires for the sake of cleanliness and strength. The enclosure must be accounted for in controlling heat transfer and storage.

DISCLOSURE OF INVENTION

One object of the invention is to provide a superior temperature sensing probe—a probe which exhibits greater accuracy in the circumstance of change in the temperature to be sensed.

A principal object is to provide a sensor capable of monitoring and rapidly detecting change in gas temperature—particularly temperature increase in respiratory gas flow at the low flow rates experienced in respirating premature infants.

These and other objects and advantages of the invention are realized, at least in part, by arranging the thermistor housing and the thermistor's electrical leads such that there is efficient heat transfer to and from the thermistor by elements that are subjected to the temperature to be measured and to minimize heat transfer between the thermistor and elements which constitute heat sinks.

The need for sterility in medical applications makes it impractical to expose the thermistor directly to the medium or thing whose temperature is to be monitored. In the preferred form of the invention the thermistor is housed in a sheath of thermally conductive material. A means is included for insuring good thermal contact between the thermistor and the sheath. The thermistor leads, which are necessarily good electrical conductors and therefor good thermal conductors, are made long to minimize heat transfer to and from the thermistor, and they are contained in a poor thermal conducting medium. In addition, the thermistor sheath and electrical conductor assembly is held together by an outer housing which serves as a thermal insulator for the thermistor sheath.

Whatever its functional merit, a temperature sensor has limited utility unless it can be produced and made available at reasonable cost. Another object of the invention is to provide an accurate, reliable, and long-lived sensor at reasonable cost. That object is accomplished in the preferred form by using the thermistor electrical leads as a spring by which the thermistor is held in good thermal contact with its covering sheath. The thermistor leads are coiled both to form a compression spring and to increase the lead length between the thermistor and the external conductors by which the thermistor leads are connected to the thermistor resistance measuring unit. Practical external conductors have sufficient size and mass as to constitute a heat sink of significant capacity. While not obvious, it has been discovered that heat transfer to and from the thermistor through the thermistor's electrical leads is reduced in substantial degree by lengthening those leads, particularly if they are disposed in a sealed air space.

In the preferred embodiment the leads are coiled and the end of the shield away from the end that is engaged by the thermistor is sealed whereby the interior of the shield becomes a "dead" air space.

The manner of sealing the shield, the arrangement for supporting the coiled thermistor leads and other structural features of the invention, are better understood by reference to the drawings. Their description appears in the Description of Preferred Embodiment that follows.

BRIEF DESCRIPTION OF THE DRAWINGS

The preferred embodiment is shown in the drawings in a straight form and in a right-angled form.

FIG. 1 is an isometric view of the straight sensor;

FIG. 2 is a cross-sectional view of the sensor of FIG. 1 taken on a plane containing the axis of the sensor;

FIG. 3 is a cross-sectional view of the right-angled sensor; and

FIG. 4 is a cross-sectional view of a fragment of the sensor of FIG. 3 taken on the midplane containing the right angle.

DESCRIPTION OF THE PREFERRED EMBODIMENT

In FIG. 1 the probe, generally designated 10, is connected at the end of a length of coaxial cable 8. The probe 10 includes an outer housing 12 which is integrally formed of a cylindrical portion 14 at the sensor end, a cylindrical portion 16 at the coaxial cable end, and a strain relief section 18 which is fixed to the cylindrical section 16 and surrounds the end through which the coaxial cable 8 extends. In addition, the outer housing 12 includes a body portion 20 between the sections 14 and 16 which is shaped like a rectangular box except that two of its opposed sides have the shape of truncated triangles. A sensor sheath 22 extends from the cylindrical portion 14 of the housing, and it is this sheath which is subjected to the temperature to be measured. The embodiment selected for illustration is intended for measuring the temperature of respiratory gas. The sensor sheath 22 is a good conductor, in thin sections, of thermal energy, whereas the outer housing is not. In some applications, the probe would be mounted so that the whole of the sheath 22 is subjected to the gas whose temperature is to be measured. In other applications for the invention, the cylindrical portion 14 might be extended to cover more or less of the sheath 22 than is illustrated in this example.

As best shown in FIG. 2, the sensor sheath 22 is enlarged at its rearward end 24, the lower end in FIG. 2. This rearward end is enlarged and, except that it is smaller, its exterior is shaped approximately like the exterior shape of the section 20 of the outer housing 12. The forward tip 26 of sheath 22 is closed. The rearward end is open to receive the end of the coaxial cable 8.

The coaxial cable 8 comprises a center conductor 30 which extends along the axis of the cable. Surrounding the center conductor is a dielectric core 32 which is covered by a layer 34 of wire braid. The braid is covered by the outer covering layer or sheath 36. In this embodiment, that part of the cable that extends through the strain relief structure 18 and the cylindrical portion 16 and part of the rearward end of the outer housing 20 is protected by a thin-walled plastic insulating strain relief tube 38. That tube has an inner diameter of which is substantially equal to the outer diameter of the cable 8.

The end of the coaxial cable is trimmed away to expose a length of the center conductor and so that several wires of the braid extend from the end of the cable. The braid wires are twisted together to form a single wire. One of the wire or center conductor, preferably the center conductor, is enclosed over most of its length in a length of electrically insulating tubing. In FIG. 2, that tubing is identified by the reference numeral 40. Its primary function is to ensure that the center conductor is not short circuited to the braid wire 34 of the braid wires 42.

The inner end of the coaxial cable is surrounded by a metal sleeve 44 which is crimped down around the cable with sufficient force so that it will remain in position, fixed on the end of the cable.

The thermistor and spring assembly is formed by the thermistor body 46, its lead wires 48 and 50, and two concentrically arranged thermally insulating tubes, the outer one 52 and the inner one 54. In this preferred embodiment, both of the thermistor lead wires are wound in the form of spirals around a respectively associated one of the two concentric tube. Lead wire 48 is wound around the inner tube 54, and the lead wire 50 is wound around the outer tube 52. A solid rod could be substituted for the inner tube 54, but the tubular construction is preferred because it forms a lesser heat path in view of its smaller cross-sectional area.

The ends of the conductors are soldered one to the braid wires 42 and the other to the center conductor 30 of the coaxial cable. The tubes 52 and 54 on which the lead wires are wound are less long than the distance between the end of the coaxial cable 8 and the body of the thermistor 46 so that those structures do not form a heat path from the thermistor to the coaxial cable, but rather are disposed in the air space within the sensor sheath 22 along with the two lead wire coils. In addition, the fact that the two tubes 52 and 54 are less long than the distance from the thermistor to the cable permits the coiled lead wires to act as a compression spring to urge the thermistor into engagement with the inner wall of the tip end 26 of the sensor sheath 22. The length of the structure from the forward tip of the thermistor 46, the upper end in FIG. 2, to the far end of the crimped sleeve 44 is slightly longer in relaxed condition than is the inner length of the sheath.

That assembly, the thermistor, its spring wound lead wires, the support tubes 52 and 54, and the end of the coaxial cable with its crimped sleeve 44 are inserted into the sensor sheath 22 so that the rearward end of the crimped sleeve 44 is flush with the rear surface of the sensor sheath 22. The dimensions are such that a light press fit is formed. That assembly completed, the sleeve 38 is positioned so that it abuts, or almost abuts, the rearward end of sleeve 44. Thereafter, the outer housing structure 12, including the cylindrical portions 14 and 16, the strain relief structure 18, and the main body section 20, are integrally molded in situ around the sheath 22 and the insulating strain relief sleeve 38.

The arrangement in which the end of the coaxial cable is surrounded by a metal ferrule 44 which is press fitted into the rear end of sheath 22, has the effect of preventing the material of which the outer housing is formed from entering into the air space within the sheath 22 during the molding process. As a consequence, the whole of the thermistor conductor spring assembly is suspended in that air space. That the outer conductor wire may touch the inner surface of the sensor sheath 22 at one point or another is of little moment. The sheath 22 is electrically non-conductive, but it is a relatively good conductor of heat transversely in thin sections, but a poor conductor in the "thicker" longitudinal axis. That is accomplished, in part, by forming it of thermal plastic resin which is loaded with a heat conductive filler material. The tubes 52 and 54 are made of electrically insulating material whose thermal conductivity is very low, and the outer housing 12 is formed of a plastic material which is ordinarily electrically nonconducting and has low thermal conductivity. Sleeve 38 is also a good insulator.

The end result is a structure in which temperature to be measured is applied by sheath 22 to the thermistor 46 with minimum time delay. The lead wires 48 and 50 are so long that little heat transfer to and from the thermistor occurs through them. Surrounded as they are by air, almost all thermal transfer by the wires must proceed over the whole length of those wires. Consequently, it matters not that the rearward end of the sheath 22 has increased mass and heat storage capacity. That part of the sheath 22 is thermally insulated from its surroundings by the housing 12 whose thermal conductivity is very low.

The unit thus constructed is completely sealed. It is easy to sterilize, and it exhibits a high degree of reliability notwithstanding that the supporting structure for the spring wound thermistor wires appears to be unsupported. In a typical unit, the diameter of the sheath is about 175 thousandths of an inch. The mass of the thermistor and its conductor wires and its supporting structure is sufficiently low so that there is virtually no change in physical arrangement of those elements, even if the sensor is handled roughly.

The right-angled arrangement of FIG. 3 employs substantially the same construction as is employed in the embodiment of FIGS. 1 and 2 except that the main portion 60 of the outer housing 62 is cylindrical in cross-section and is bent at a right angle. In this version, the bent portion of the housing and of the coaxial cable and its protective sheath occur entirely behind the end 64 of the thermistor sheath 66, and in back of the metal crimping sleeve 69. That construction is not essential. It is possible to make the thermistor wires, or wires soldered to the thermistor conductors, serve as bias springs to ensure physical engagement of the thermistor 96 with the wall of the thermistor sheath 98 without relying on the forced fit of the coaxial cable structure into the sheath to preserve the air space. The open end of the transistor sheath can be closed with a body of adhesive material prior to molding the outer housing. While that construction does not incorporate all of the features of the invention, it does incorporate some of them.

In both of these embodiments, thermal contact between the thermistor and its sheath can be enhanced, when the application permits, by adding a small quantity of thermally conductive grease to the inner end wall of the sheath, or to the thermistor, such that the grease wets and makes good thermal contact with both. The grease is visible in FIG. 2 where it is numbered 100. It is also visible in FIG. 4 where it is numbered 102.

Although we have shown and described certain specific embodiments of our invention, we are fully aware that many modifications thereof are possible. Our invention, therefore, is not to be restricted except insofar as is necessitated by the prior art.

We claim:

1. A temperature sensing probe comprising:
a temperature sensing element;
a pair of lead wires connected to and extending from said element and electrically insulated one from the other;
an electrically insulating sensor sheath one end of which is closed and in which said sensor and said pair of lead wires are contained such that said sensor is in thermal contact with the interior of said one end of said sensor sheath;
an outer housing embracing all but said one end section of said sensor sheath;
thermal conductivity of said sensor sheath exceeding the thermal conductivity of said outer housing;
external connection means for making electrical connection to said sensing element through said lead wires;
means for biasing said temperature sensing element into engagement with the inner end of said one end section of the sheath; and
said sensor and said external connection means together forming a closed elongated air filled cavity in which said lead wires are enclosed.

2. A temperature sensing probe comprising:
a temperature sensing element;
a pair of lead wires connected to and extending from said element and electrically insulated one from the other;
an electrically insulating sensor sheath one end of which is closed and in which said sensor and said pair of lead wires are contained such that said sensor is in thermal contact with the interior of said one end of said sensor sheath;
an outer housing embracing all but said one end section of said sensor sheath;
thermal conductivity of said sensor sheath exceeding the thermal conductivity of said outer housing;
external connection means for making electrical connection to said sensing element through said lead wires;
said sensor sheath and said external connection means together forming a closed elongated air filled cavity in which said lead wires are enclosed;
said lead wires being formed as elongated springs compressible in the direction of the length of said cavity.

3. The invention defined in claim 2 in which said lead wires are coiled.

4. The invention defined in claim 2 in which said lead wires are coiled and the coils concentrically arranged.

5. The invention defined in claim 4 in which each of said lead wires is wound about a length of hollow tubing.

6. The invention defined in claim 5 in which said external connection means comprises two conductors each connected to a respectively associated one of said lead wires at a point within said sensor sheath.

7. The invention defined in claim 6 in which said sensor sheath is tubular and has an end closure and said one end, said sensor being maintained in thermal engagement with said end closure by at least one of said lead wires acting as a spring.

8. The invention defined in claim 7 in which said external connection means is sealed to the other end of said sensor sheath opposite said one end.

9. The invention defined in claim 8 in which said outer sheath comprises a plastic body molded in situ over said other end of said sensor sheath.

10. The invention defined in claim 5 in which said external connection comprises the end portion of a length of electrical cable and a clamp embracing said end portion;
said clamp being sealed over a portion of its length, into the other end of said sensor sheath opposite said one end;
said outer sheath comprising a body of moldable material molded in situ over the clamp and said other end of said sensor sheath.

11. An air temperature sensor comprising:
a thermistor;
temperature maintainence means for ensuring that the thermistor is maintained at a temperature substantially equal to the temperature of the air in which it is disposed, said temperature maintainence means comprising a hollow sheath of relatively high thermally conductivity having a closed end and the thermistor disposed in the sheath in thermal contact with said end;
conductor means in the form of an electrically conductive and compression spring disposed in said sheath for completing an electrical connection to said thermistor and for maintaining said thermistor in thermal contact with the end of the sheath.

12. The invention defined in claim 11 in which said conductor means comprises a pair of electrically conductive compression springs electrically insulated one from the other and disposed in parallel in said sheath.

13. The invention defined in claim 11 in which said conductor means comprises a coiled compression spring.

14. The invention defined in claim 13 which further comprises sheath closure means disposed in the other end of said sheath and serving to bear against the end of the compression spring opposite said thermistor.

15. The invention defined in claim 14 which further comprises a covering of relatively non-thermally conductive material encompassing portions of said sheath closure means and portions of said sheath other than at said closed end.

16. The invention defined in claim 11 in which said conductor means comprises a pair of electrically conductive coils at least one of which serves as a compression spring.

17. The invention defined in claim 11 in which the coils are exposed to air trapped within said sheath.

* * * * *